Oct. 28, 1958 — V. H. SELIGER — 2,857,798
AUTOMATIC OPTICAL DRIFT ANGLE INDICATOR
Filed July 16, 1954 — 2 Sheets-Sheet 1
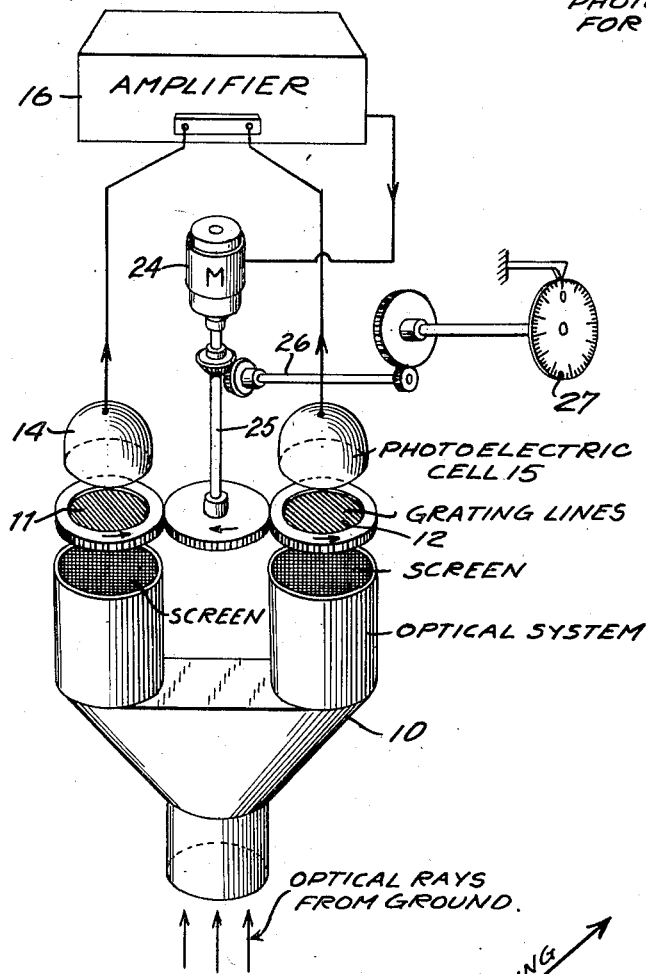
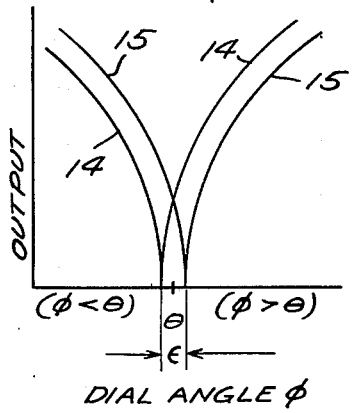
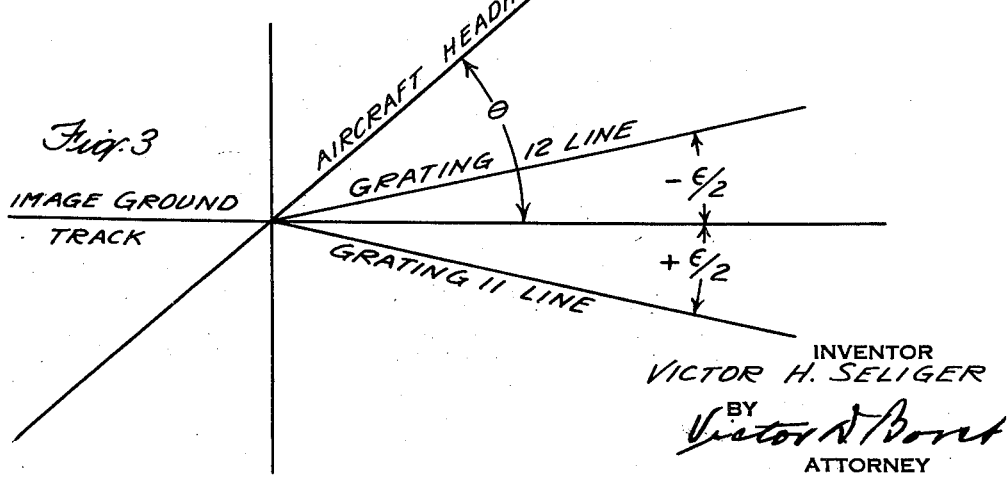
INVENTOR
VICTOR H. SELIGER
BY
Victor N. Bont
ATTORNEY Oct. 28, 1958   V. H. SELIGER   2,857,798
AUTOMATIC OPTICAL DRIFT ANGLE INDICATOR
Filed July 16, 1954   2 Sheets-Sheet 2

INVENTOR
VICTOR H. SELIGER
BY
ATTORNEY

United States Patent Office 2,857,798
Patented Oct. 28, 1958

2,857,798

AUTOMATIC OPTICAL DRIFT ANGLE INDICATOR

Victor H. Seliger, Forest Hills, N. Y., assignor to Sperry Rand Corporation, a corporation of Delaware Application July 16, 1954, Serial No. 443,743

4 Claims. (Cl. 88—1)

This invention relates to an aeronautical device for automatically computing drift angle.

There exists at present manual visual drift angle indicators for aircraft which require the operator to rotate an optical parallel line grating, which is placed over a simple mechanism for producing an image of the ground, until the lines are aligned with the tracks made by the ground objects forming the image. A dial or pointer may be driven by the gratings to indicate drift angle, which is defined as the angle between aircraft heading and ground track.

This invention contemplates a device which makes the determination of drift angle completely automatic so that the operator, who may be the pilot, merely needs to look at a dial to know his drift angle.

In general, the automatic computation is achieved as follows: Twin images of the ground track are projected through a pair of rotatable gratings similar to those in present use. The gratings are oriented at slightly different angles so that the high-frequency content of the fluctuation in transmitted light, which is present because of the rapid change in light transmission produced by the opaque lines, is, in general, different for each grating. The instantaneous value of light from each grating is converted to an electronic signal by photoelectric devices, the outputs of which are amplified and used to drive a motor. The motor in turn is connected to the gratings to rotate them in a direction depending on the algebraic sign of the difference in high-frequency content. When the gratings have been rotated until the high frequency output from each is the same, the angular orientation of the gratings will uniquely correspond to the angle of the ground track with respect to the aircraft heading. The device includes a dial which is also geared to the motor so that the drift angle can be read directly.

The device incorporates other features which will be apparent from the following detailed description when taken in conjunction with the accompanying drawings.

Fig. 1 is a diagrammatic showing of the device for automatic computation of drift angle;

Fig. 2 is a graph showing the relation between the high frequency output and grating angle;

Fig. 3 is a graph showing certain quantities relevant to the determination; and

Figure 4:
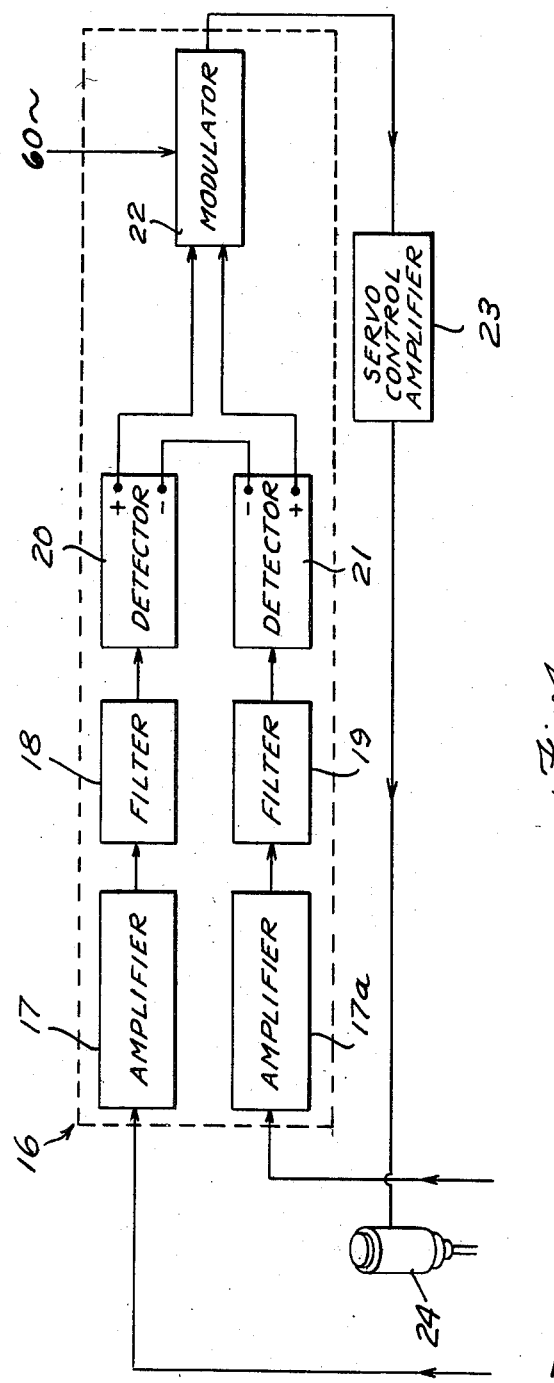
Fig. 4 is a schematic of the amplifier and servo drive employed in the computing device.

According to the drawings the numeral 10 indicates a simple optical device which produces two identical parallel images of the viewed objects.

Rotatable gratings 11 and 12 are mounted in optical alignment with the image revealing lenses of the optical device 10. The gratings are made of transparent material and have parallel opaque lines ruled thereon. The gratings are oriented at slightly different angles with the axes of orientation of the opaque lines being displaced by an angle $e$. The varying amount of total light flux passing through the optical grating will contain higher frequency components, the magnitudes of which will be largely dependent upon the relative orientation between the ground track and the optical grating lines. For example, when a grating's lines are parallel to the ground track, there will be practically no rapid changes of its transmitted light intensity with the time over short time intervals; whereas when a grating's line orientation is at right angles to the ground track, there will be a maximum number of such changes per unit time. In other words, the intensity of light transmitted through each cell will vary with time as the aircraft moves along the ground track. This functional relationship will depend upon the angular orientation of the optical grating with respect to the image ground track. Thus, there will be a high frequency fluctuation of the light when the grating lines are perpendicular to the image ground track and almost no fluctuation when the grating lines are parallel to the ground track. Another way of considering this fact is to imagine the functional relationship between light intensity and time to be resolved into a Fourier series. Thus, when the grating lines are perpendicular to the image ground track maximum amplitudes will occur in a range of terms of comparatively low frequencies. Intermediate positions of the grating lines with respect to the image ground track will result in the occurrence of maximum amplitudes in a range of terms of corresponding intermediate frequencies. Now, if a photosensitive device converts such fluctuations in light intensity into electrical fluctuations, the difference in the Fourier frequency spectra of the electrical signals from two such gratings oriented at slightly different angles may be used to indicate the direction in which the pair of gratings must mutually be turned in order to equalize the corresponding frequency components of the light outputs of the two gratings. When the gratings have been rotated until the corresponding frequency components are equalized, the angle of orientation will be the angle of the ground track with respect to the aircraft heading reference line if proper calibration is effected beforehand. This position may be read directly on a dial geared to the optical gratings.

Photosensitive devices 14 and 15 are therefore mounted before each grating so that the transmitted light impinges on their light sensitive surfaces. The high frequency light flux is thereby converted to electrical fluctuations. The devices 14 and 15, which may be photoelectric cells or phototubes, are connected to amplifier 16. When the reflected light from the ground track falls across the grating lines at different angles, the high frequency amplifier inputs will differ in magnitude. The amplifier 16 must have amplifying, filtering, detecting units, and a comparison element, which in the preferred embodiment is a modulator unit, for the amplification, gain filtering detection, and comparison of the high frequency components.

As shown in Fig. 4 the elements of amplifier 16 comprise parallel channels, each including an amplifier, filter and detector, and a modulator the output of which is used to drive servo components which operate the gratings. Accordingly, the inputs to amplifiers 17 and 17a are amplified and delivered, respectively, to the filters 18 and 19 which may be conventional units designed so that the db gain of each is proportional to the log of the input frequency. The filter outputs are then delivered to detectors 20 and 21, each of which produces a direct current voltage proportional to the amplitude of the input signal. The two detectors are connected to modulator 22 in polarity opposition, thus delivering to the modulator the algebraic difference of their outputs.

A carrier voltage preferably of 60 or 400 cycles, is also supplied to the modulator, and the resulting modulated wave is amplified by a servo-control amplifier 23 and used to drive motor 24. The motor 24 is a standard two-phase motor which may operate in a clockwise or counterclockwise direction depending on the relative phasing of the voltage inputs. The servo-control amplifier 23 and the motor 24 are conventional components in combination, being shown, for example, in United States Letters Patent No. 2,752,091.

For example, consider a single channel delivering voltage to the modulator. Let this channel be composed of device 14, amplifier 16, filter 18 and detector 20. Then the function of this channel is to produce a direct current voltage approximately proportional to the frequency-weighted sum of the input signal components. The two such channels connected in opposition then produce an alternating voltage equal to the difference in voltage delivered by each individual channel. It is this alternating voltage delivered to the modulator 22 which serves as the error input signal to the servo drive components consisting of modulator 22, servo control amplifier 23 and motor 24.

A gear train 25 connects the motor output to gratings 11 and 12 to drive them in the same direction. Another gear train 26 connects the motor to a dial 27 which is calibrated to indicate drift angle when the magnitudes of the high frequency components for the two amplifier inputs are equal as shown in Fig. 3. The gear train, optical gratings and dial are so aligned that when the ground track is exactly parallel to the flight line in air, the dial reads zero, and the angular differences between the parallel lines of the gratings and the image ground tracks are equal and opposite. That is, for grating 11 the angle is $e/2$, and for grating 12 the angle is $-e/2$.

Figure 2 shows the relations between the high-frequency output components of cell 14 and cell 15, and the dial angle $\phi$, for an assumed drift angle $\theta$. It is clear that when $\phi$ is less than $\theta$, the higher frequency output of cell 15 is greater than the output of cell 14; when $\phi$ is greater than $\theta$, the higher-frequency output of cell 14 is greater than that of cell 15. When the higher-frequency components of the output of cell 14 are greater than those of the output of cell 15, motor 24 drives in a direction such as to bring the lines of grating 11 more nearly in line with the image associated with cell 14; motor 24 rotates in the opposite direction when the higher-frequency components of the output of cell 15 are greater.

The components described therefore can be operated as a closed-loop system which tends to drive the optical gratings to the position at which the lines of grating 11 make an angle of $e/2$ with the image ground track and the lines of grating 12 make an angle of $-e/2$ with the image ground track. When this condition is reached, dial 27 reads the drift angle directly. Additional servo stabilization elements such as rate generators, differentiating circuits, and the like, may be incorporated as required, but are not shown in Fig. 1.

The device embodying the invention has been described as adapted especially for visible radiation, but it is quite apparent that operation with other radiation, such as infra-red or radar, would require only minor changes in the units. For example, especially sensitized infra-red screens could be provided in the optical device 10 or radar detection devices in place thereof, with photoelectric units especially equipped to convert radar presentations to electrical energy.

It will be understood that the described embodiment of the invention is for illustrative purposes only and that the invention is to be defined and limited in accordance with the following claims.

What is claimed is:

1. An automatic optical drift angle indicator comprising a pair of rotatable gratings having a plurality of parallel opaque lines ruled thereon, an optical device adapted to project a pair of identical ground images through the gratings, said gratings having an orientation differential, a pair of light responsive electric cells mounted in optical alignment with said gratings, an electronic amplifier having amplifying, filtering and phase detecting elements in connection with each of said radiant energy responsive cells, a comparison circuit connected to said amplifier, a reversible, phase controlled motor connected to said comparison circuit, indicating means, and a gear train connecting said motor to the rotatable gratings and said indicating means, whereby the gratings are adapted to be driven by said motor until the modulator output is zeroed and said indicating means automatically registers the desired drift angle.

2. An automatic optical drift indicator comprising a pair of rotatable gratings having a plurality of parallel opaque lines ruled thereon, an optical device for receiving radiant energy and adapted to project a pair of identical ground images through the gratings, said gratings having an orientation differential, a pair of radiant energy responsive, electrical generating elements mounted in optical alignment with said gratings and arranged to receive radiant energy simultaneously therefrom, means connected to said pair of generating elements for producing an error signal proportional to the algebraic sum of the voltages delivered to said means from said generating elements, drive means connected to said error signal producing means and to said gratings for rotating said gratings until said error signal has been nulled and an angle indicator connected to said drive means calibrated to indicate the drift angle on zero error signal.

3. An automatic optical drift angle indicator as claimed in claim 2 wherein said error signal producing means comprise an amplifier connected to each of said pair of electrical generating elements, a filter connected to each amplifier a detector and a comparison circuit connected to each filter, whereby direct current voltage is produced which is proportional to the algebraic addition of the input volages produced by each of said detectors.

4. An automatic optical drift angle indicator as claimed in claim 3 wherein said comparison circuit is a modulator, said modulator being connected in polarity opposition to said detectors, and said drive means comprise a servo control amplifier connected to the output of said modulator and a reversible, phase controlled motor operatively driven by said servo control amplifier.

References Cited in the file of this patent

UNITED STATES PATENTS

| | | |
|---|---|---|
| 2,153,718 | Kitroser | Apr. 11, 1939 |
| 2,167,484 | Berry | July 25, 1939 |
| 2,425,541 | Konet | Aug. 12, 1947 |
| 2,439,295 | Hammond et al. | Apr. 6, 1948 |
| 2,651,771 | Palmer | Sept. 8, 1953 |